United States Patent
Bradley et al.

(10) Patent No.: US 8,849,663 B2
(45) Date of Patent: Sep. 30, 2014

(54) SYSTEMS AND METHODS FOR SEGMENTING AND/OR CLASSIFYING AN AUDIO SIGNAL FROM TRANSFORMED AUDIO INFORMATION

(75) Inventors: David C. Bradley, La Jolla, CA (US); Robert N. Hilton, San Diego, CA (US); Daniel S. Goldin, Malibu, CA (US); Nicholas K. Fisher, San Diego, CA (US); Derrick R. Roos, San Diego, CA (US); Eric Wiewiora, San Diego, CA (US)

(73) Assignee: The Intellisis Corporation, San Diego, CA (US)

( * ) Notice: Subject to any disclaimer, the term of this patent is extended or adjusted under 35 U.S.C. 154(b) by 540 days.

(21) Appl. No.: 13/205,507

(22) Filed: Aug. 8, 2011

(65) Prior Publication Data

US 2012/0243694 A1     Sep. 27, 2012

Related U.S. Application Data (60) Provisional application No. 61/454,756, filed on Mar. 21, 2011, provisional application No. 61/467,493, filed on Mar. 25, 2011.

(51) Int. Cl.
*G10L 17/00* (2013.01)
*H04R 3/00* (2006.01)
*G10L 17/02* (2013.01)

(52) U.S. Cl.
CPC ...... *H04R 3/00* (2013.01); *G10L 17/02* (2013.01); *H04R 2430/03* (2013.01)
USPC ............. 704/246; 704/240; 704/256; 381/56; 381/94.4; 381/94.3; 700/94; 340/426.28; 340/426.16

(58) Field of Classification Search
CPC .. G10I 25/90; G10I 2025/906; G10I 15/1822; G10I 17/26; G10I 15/30; H04R 3/00; H04R 2430/03; H04R 3/005; H04R 2430/23; H04R 2225/41; G10L 17/02
USPC ......... 704/246, 201, 256, 226, 205, 207, 240, 704/270.1; 340/426.28, 426.18; 381/98, 56, 381/94.4, 94.1, 92, 122, 94.3; 713/176; 700/94

See application file for complete search history.

(56) References Cited

U.S. PATENT DOCUMENTS

| | | | |
|---|---|---|---|
| 5,815,580 A | 9/1998 | Craven et al. | 381/58 |
| 7,117,149 B1 | 10/2006 | Zakarauskas | 704/233 |
| 7,249,015 B2 | 7/2007 | Jiang et al. | 704/222 |
| 7,389,230 B1 | 6/2008 | Nelken | 704/255 |
| 7,596,489 B2* | 9/2009 | Kovesi et al. | 704/219 |
| 7,664,640 B2 | 2/2010 | Webber | 704/243 |
| 7,668,711 B2 | 2/2010 | Chong et al. | 704/219 |
| 7,774,202 B2* | 8/2010 | Spengler et al. | 704/236 |
| 7,991,167 B2* | 8/2011 | Oxford | 381/92 |
| 8,447,596 B2* | 5/2013 | Avendano et al. | 704/226 |
| 8,767,978 B2 | 7/2014 | Bradley et al. | 381/98 |
| 2004/0128130 A1 | 7/2004 | Rose et al. | 704/236 |
| 2004/0176949 A1 | 9/2004 | Wenndt et al. | 704/203 |
| 2004/0220475 A1 | 11/2004 | Szabo et al. | 600/458 |
| 2005/0114128 A1 | 5/2005 | Hetherington et al. | 704/233 |
| 2006/0100866 A1 | 5/2006 | Alewine et al. | 704/226 |
| 2006/0122834 A1* | 6/2006 | Bennett | 704/256 |
| 2006/0262943 A1* | 11/2006 | Oxford | 381/92 |
| 2007/0010997 A1 | 1/2007 | Kim | 704/208 |
| 2008/0082323 A1 | 4/2008 | Bai et al. | 704/214 |
| 2009/0012638 A1 | 1/2009 | Lou | 700/94 |
| 2009/0076822 A1 | 3/2009 | Sanjaume | 704/268 |
| 2009/0228272 A1* | 9/2009 | Herbig et al. | 704/233 |
| 2010/0260353 A1 | 10/2010 | Ozawa | 381/94.3 |
| 2010/0332222 A1 | 12/2010 | Bai et al. | 704/214 |
| 2011/0016077 A1 | 1/2011 | Vasilache et al. | 706/52 |
| 2011/0060564 A1 | 3/2011 | Hoge | 703/2 |
| 2011/0286618 A1 | 11/2011 | Vandali et al. | 381/320 |
| 2012/0243705 A1* | 9/2012 | Bradley et al. | 381/94.4 |
| 2012/0243707 A1* | 9/2012 | Bradley et al. | 381/98 |
| 2013/0041489 A1* | 2/2013 | Bradley et al. | 700/94 |
| 2013/0041656 A1* | 2/2013 | Bradley et al. | 704/207 |
| 2013/0041658 A1* | 2/2013 | Bradley et al. | 704/208 |
| 2014/0037095 A1* | 2/2014 | Bradley et al. | 381/56 |

FOREIGN PATENT DOCUMENTS

| WO | WO 2012/129255 | 9/2012 |
|---|---|---|
| WO | WO 2012/134991 | 10/2012 |
| WO | WO 2012/134993 | 10/2012 |

OTHER PUBLICATIONS

Kumar et al., "Speaker Recognition Using GMM", International Journal of Engineering Science and Technology, vol. 2, No. 6, 2010, [retrieved on: May 31, 2012], retrieved from the Internet: http://www.ijest.info/docs/IJEST10-02-06-112.pdf, pp. 2428-2436.

Kamath et al, "Independent Component Analysis for Audio Classification", IEEE 11th Digital Signal Processing Workshop & IEEE Signal Processing Education Workshop, 2004, [retrieved on: May 31, 2012], retrieved from the Internet: http://2002.114.89.42/resource/pdf/1412.pdf, pp. 352-355.

Vargas-Rubio et al., "An Improved Spectrogram Using the Multiangle Centered Discrete Fractional Fourier Transform", Proceedings of International Conference on Acoustics, Speech, and Signal Processing, Philadelphia, 2005 [retrieved on Jun. 24, 2012], retrieved from the internet: <URL: http://www.ece.unm.edu/faculty/beanthan/PUB/ICASSP-05-JUAN.pdf>, 4 pages.

Serra, "Musical Sound Modeling with Sinusoids plus Noise", 1997, pp. 1-25.

\* cited by examiner

Primary Examiner — Vijay B Chawan (74) *Attorney, Agent, or Firm* — Pillsbury Winthrop Shaw Pittman LLP (57) ABSTRACT

A system and method may be provided to segment and/or classify an audio signal from transformed audio information. Transformed audio information representing a sound may be obtained. The transformed audio information may specify magnitude of a coefficient related to energy amplitude as a function of frequency for the audio signal and time. Features associated with the audio signal may be obtained from the transformed audio information. Individual ones of the features may be associated with a feature score relative to a predetermined speaker model. An aggregate score may be obtained based on the feature scores according to a weighting scheme. The weighting scheme may be associated with a noise and/or SNR estimation. The aggregate score may be used for segmentation to identify portions of the audio signal containing speech of one or more different speakers. For classification, the aggregate score may be used to determine a likely speaker model to identify a source of the sound in the audio signal.

20 Claims, 6 Drawing Sheets

SYSTEMS AND METHODS FOR SEGMENTING AND/OR CLASSIFYING AN AUDIO SIGNAL FROM TRANSFORMED AUDIO INFORMATION

RELATED APPLICATIONS

This application claims the priority benefit of U.S. provisional patent application No. 61/454,756, filed on Mar. 21, 2011, and entitled "Audio Classification Using Confidence-Weighted Feature Trajectories" and U.S. provisional patent application No. 61/467,493, filed on Mar. 25, 2011, and entitled "Spectral Motion Transformation," both of which are hereby incorporated into this disclosure by reference in their entirety.

FIELD

The invention relates to segmenting and/or classifying an audio signal from transformed audio information to identify a source of a sound in the audio signal based on scores associated with different features of the sound, with the scores being weighted based on noise present in the audio signal and/or the transformed audio information.

BACKGROUND

Systems and methods for determining a source of a sound in an audio signal are known. Generally, these techniques focus on high-level information that is non-trivial to derive from a raw signal. Speech, for example, can be largely characterized by the frequencies of the pitch and vocal tract formats. Existing techniques usually rely on omitting detected features that fall below an energy threshold. These approaches, however, may lose a great deal of information that would otherwise be useful for source identification.

Furthermore, in "noisy" conditions (e.g., either sound noise or processing noise) the accuracy and/or precision of conventional techniques may drop off significantly. Since many of the settings and/or audio signals in and on which these techniques are applied may be considered noisy, conventional processing to identify a source of a sound in an audio signal may be only marginally useful.

SUMMARY

One aspect of the disclosure relates to systems and methods for segmenting and/or classifying an audio signal from transformed audio information. The system and method may include obtaining one or more features associated with the audio signal from transformed audio information (e.g., frequency domain information, pseudo-frequency domain information, and/or other non-time-domain information). Individual features may be associated with a feature score relative to a predetermined speaker model. An aggregate score may be obtained based on the feature scores according to a weighting scheme. The weighting scheme may be associated with a noise estimation. The aggregate score may be used for segmentation to identify portions of the audio signal containing speech of one or more different speakers. For classification, the aggregate score may be used in conjunction with the predetermined speaker model to identify a source (e.g., a specific person) of the sound in the audio signal.

In some implementations, a system may be configured for segmenting and/or classifying an audio signal from transformed audio information. The system may comprise one or more processors configured to execute computer program modules. The computer program modules may comprise one or more of an audio information module, an audio features module, an information reduction module, a spectral slope module, an SNR estimator module, an aggregate score module, a training module, and/or other modules.

The audio information module may be configured to obtain transformed audio information representing one or more sounds. The audio signal may have a duration. That is, the audio signal may span a discrete period of time. The transformed audio information may have been transformed in discrete time sample windows over the audio signal. The time sample windows may be overlapping or non-overlapping in time. The transformed audio information may include pitch and/or pitch information associated with the audio signal. In some implementations, pitch and/or pitch information may be determined as described in one or both of U.S. patent application Ser. No. 13/205,483, filed Aug. 8, 2011, and entitled "System And Method For Tracking Sound Pitch Across An Audio Signal", and/or U.S. patent application Ser. No. 13/205,521, filed Aug. 8, 2011, and entitled "System And Method For Tracking Sound Pitch Across An Audio Signal Using Harmonic Envelope," which are hereby incorporated by reference into the present application in their entireties. The transformed audio information may specify magnitude of a coefficient related to signal intensity as a function of frequency for an audio signal and time. In some implementations, the transformed audio information for the time sample window may include a plurality of sets of transformed audio information. The individual sets of transformed audio information may correspond to different fractional chirp rates. Obtaining the transformed audio information may include transforming the audio signal, receiving the transformed audio information in a communications transmission, accessing stored transformed audio information, and/or other techniques for obtaining information.

The audio features module may be configured to obtain features associated with the audio signal from the transformed audio information. One or more separate features may correspond to individual methods and/or techniques of obtaining the features. A feature may include a set of numbers that determine a vector, for individual segments of the audio signal, in a feature space. The feature space may be a multi-dimensional space where each dimension corresponds to one component (dimension) of the feature vector. Feature vectors corresponding to two or more methods and/or techniques of obtaining features may be combined (e.g., by vector summation) as an aggregate feature vector. Individual feature vectors and/or the aggregate feature vector may be used in the feature space for segmentation and/or classification.

According to some implementations, the features may include reduced transformed audio information, spectral slope information, mel-frequency cepstral coefficient vectors, harmonic amplitude vectors, harmonic amplitude surfaces, pitched harmonic amplitude surfaces, time derivatives of the harmonic amplitude surfaces, Gabor transforms of the fractional harmonic derivatives, and/or other features. In some implementations, a separate harmonic amplitude vector may correspond to individual time windows. Harmonic amplitude surfaces may be defined over multiple time windows (e.g., about 200 msec or 20 time windows). Pitched harmonic amplitude surfaces may have time-corresponding pitch values appended to the amplitude surface feature vector. Time derivatives of the harmonic amplitude surfaces may be normalized for harmonic amplitude (e.g., fractional harmonic derivatives). Gabor transforms of the fractional harmonic derivatives may serve to compress features information.

Individual features may be associated with a feature score relative to a predetermined speaker model. A speaker model may include a set of speech characteristics and/or other speech information unique to a specific person, a group of people, and/or other source of audible speech. A feature score may facilitate a comparison between a corresponding feature to one or more speech characteristics of a speaker model.

The information reduction module may be configured to obtain reduced transformed audio information as a feature associated with the audio signal. According some implementations, obtaining the reduced transformed audio information may include determining harmonic paths for individual harmonics of the sound based on fractional chirp rate and harmonic number. A harmonic path may be described as a vector function of time. Such a vector may be one-dimensional, two-dimensional, or three-dimensional, or may have another dimensionality. According to some implementations, a one-dimensional vector may describe frequency versus time, amplitude versus time, chirp rate versus time, and/or other information. A two-dimensional vector may describe frequency and amplitude versus time, frequency and chirp rate versus time, amplitude and chirp rate versus time, and/or other information. A three-dimensional vector may describe frequency, chirp rate, and amplitude versus time, and/or other information. A harmonic path may be determined over the span of a portion of the audio signal (e.g., the span of one vowel), a fixed time span (e.g., 200 msec), the entire audio signal, and/or another duration of time.

Obtaining the reduced transformed audio information may include determining an amplitude value for individual harmonics at individual time windows. The amplitude value may correspond to a magnitude of a coefficient related to energy amplitude of a given harmonic at a given time. The reduced transformed audio information may be constructed using single points that correspond to the harmonic positions for individual time windows. Those points may describe the center frequency, chirp rate, time position, amplitude value, and/or other information for individual harmonics. In some implementations, values within the reduced transformed audio information between the amplitude values may be set to zero. A filter bank may be applied to the reduced transformed audio information. The filter bank may include one or more mel filters and/or other filters.

The spectral slope module may be configured to obtain spectral slope information based on the transformed audio information as a feature associated with the audio signal. In some implementations, obtaining the spectral slope information may include determining an instantaneous slope of one or more harmonic envelopes in the transformed audio information as a function of frequency. In some implementations, instantaneous slope of a harmonic envelope may determined by taking, at a given time window, the derivative over frequency of the coefficient related to energy amplitude of the transformed audio information. A filter bank may be applied to the spectral slope information. The filter bank may include one or more mel filters and/or other filters.

The signal-to-noise-ratio (SNR) estimator module may be configured to obtain an SNR estimation as a time-varying quantity associated with the audio signal. In accordance with some implementations, obtaining the SNR estimation includes determining a harmonic energy of individual harmonics as a function of frequency and time based on the transformed audio information. An individual harmonic may be integrated over a corresponding bandwidth to determine the harmonic energy of that harmonic. A total energy of the audio signal may be determined based on the transformed audio information. Noise may be estimated as portions of the transformed audio information where the ratio between the harmonic energy and the total energy breaches a predetermined threshold. In some implementations, the ratio may be averaged over time.

The aggregate score module may be configured to obtain an aggregate score based on the feature scores according to a weighting scheme. The weighting scheme may be associated with a noise and/or SNR estimation. The aggregate score may be used to determine a likely speaker model to identify a source of the sound in the audio signal. In some implementations, the aggregate score module may be configured to obtain the aggregate score by summing weighted feature scores of one or more features obtained by the audio features module.

The training module may be configured to determine the weighing scheme utilized by the aggregate score module. In accordance with some implementations, the training module may perform training operations on the audio signal and/or other information related to the audio signal to determine characteristics of the audio signal and/or conditions pertaining to the recording of the audio signal (e.g., type of microphone, closed room versus open air, and/or other conditions) that indicate a particular set of score weights that results in more accurate classification compared to other weighting schemes.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
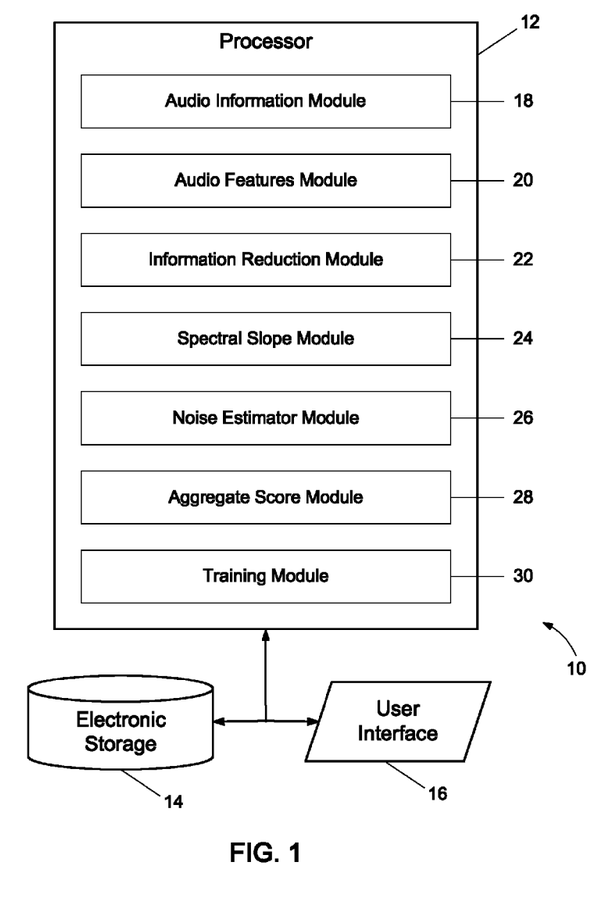
FIG. 1 illustrates a system configured for segmenting and/or classifying an audio signal from transformed audio information, in accordance with one or more implementations.

FIG. 1 illustrates a system configured for segmenting and/or classifying an audio signal from transformed audio information, in accordance with one or more implementations. The system 10 may be configured to obtain one or more features associated with the audio signal from transformed audio information. The transformed audio signal may be obtained from the audio signal through Fourier Transform, Fast Fourier Transform, Short Time Fourier Transform, Spectral Motion Transform, and/or other transforms. Individual features may be associated with a feature score relative to a predetermined speaker model. An aggregate score may be obtained based on the feature scores according to a weighting scheme. The weighting scheme may be associated with a noise estimation. The aggregate score may be used for segmentation to identify portions of the audio signal containing speech of one or more different speakers. For classification, the aggregate score may be used to determine a likely speaker model to identify a source (e.g., a specific person) of the sound in the audio signal.

The system 10 may be implemented in an overarching system (not shown) configured to process the audio signal. For example, the overarching system may be configured to segment sounds represented in the audio signal (e.g., divide sounds into groups corresponding to different sources, such as human speakers, within the audio signal), classify sounds represented in the audio signal (e.g., attribute sounds to specific sources, such as specific human speakers), reconstruct sounds represented in the audio signal, and/or process the audio signal in other ways. In some implementations, system 10 may include one or more of one or more processors 12, electronic storage 14, a user interface 16, and/or other components.

The processor(s) 12 may be configured to execute one or more computer program modules. The processor(s) 12 may be configured to execute the computer program module(s) by software; hardware; firmware; some combination of software, hardware, and/or firmware; and/or other mechanisms for configuring processing capabilities on processor(s) 12. In some implementations, the one or more computer program modules may include one or more of an audio information module 18, an audio features module 20, an information reduction module 22, a spectral slope module 24, a signal-to-noise ratio (SNR) estimator module 26, an aggregate score module 28, a training module 30, and/or other modules.

The audio information module 18 may be configured to obtain transformed audio information representing one or more sounds. The transformed audio information may include a transformation of an audio signal into the frequency domain, a pseudo-frequency domain, a dynamical-frequency domain, and/or other non-temporal domains. By way of non-limiting example, the transformed audio information may be transformed from the audio signal by way of a Fourier transform, a fast-Fourier transform, a short-time-Fourier transform, and/or other transforms. The transformed audio information may include pitch and/or pitch information associated with the audio signal. In some implementations, pitch and/or pitch information may be determined as described one or both of U.S. patent application Ser. No. 13/205,483, filed Aug. 8, 2011, and entitled "System And Method For Tracking Sound Pitch Across An Audio Signal", and/or U.S. patent application Ser. No. 13/205,521, filed Aug. 8, 2011, and entitled "System And Method For Tracking Sound Pitch Across An Audio Signal Using Harmonic Envelope," which are hereby incorporated by reference into the present application in their entireties. The transformed audio information may include a transformation of an audio signal into a frequency-chirp domain, such as that described in U.S. patent application No. 13/205,424, filed Aug. 8, 2011, and entitled "System And Method For Processing Sound Signals Implementing A Spectral Motion Transform" ("the 'YYY Application") which is hereby incorporated into this disclosure by reference in its entirety. The transformed audio information may have been transformed in discrete time sample windows over the audio signal. The time sample windows may be overlapping or non-overlapping in time. Generally, the transformed audio information may specify magnitude of a coefficient related to signal intensity as a function of frequency, time, chirp, and/or other parameters for an audio signal within a time sample window.

Figure 2:
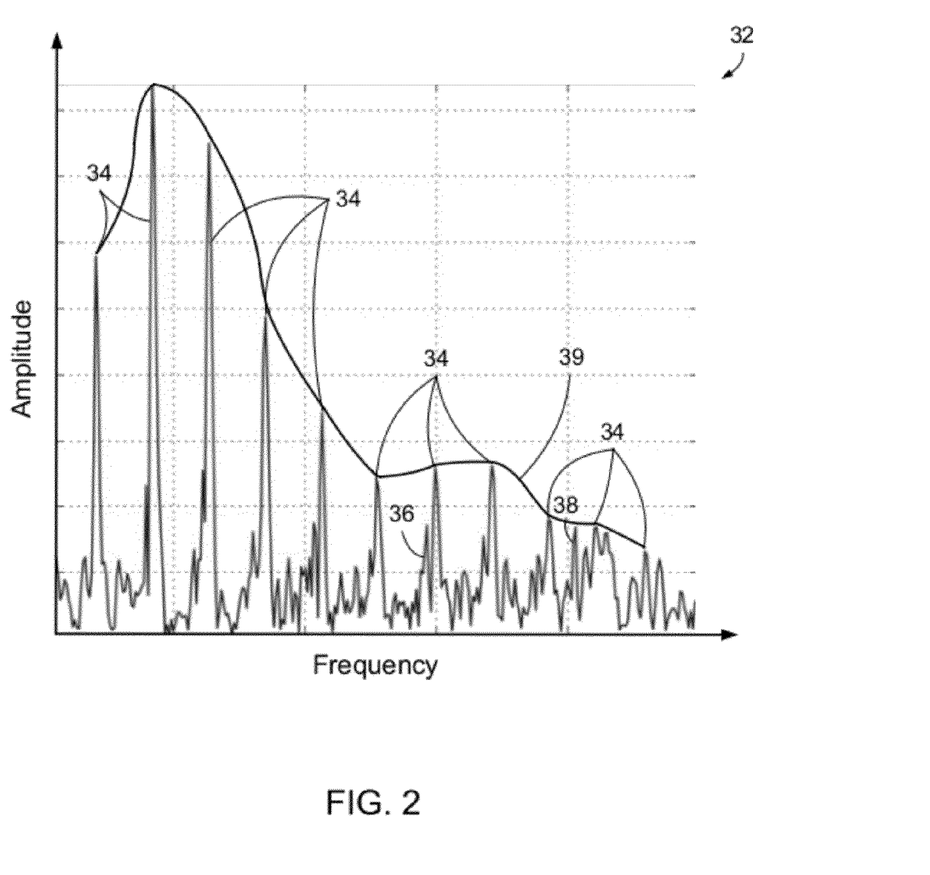
FIG. 2 illustrates an exemplary plot of transformed audio information.

By way of illustration, FIG. 2 depicts an exemplary plot 32 of transformed audio information. The plot 32 may be in a space that shows a magnitude of a coefficient related to energy as a function of frequency. The transformed audio information represented by plot 32 may include a harmonic sound, represented by a series of spikes 34 in the magnitude of the coefficient at the frequencies of the harmonics of the harmonic sound. Assuming that the sound is harmonic, spikes 34 may be spaced apart at intervals that correspond to the pitch ($\phi$) of the harmonic sound. As such, individual spikes 34 may correspond to individual ones of the overtones of the harmonic sound.

Other spikes (e.g., spikes 36 and/or 38) may be present in the transformed audio information. These spikes may not be associated with harmonic sound corresponding to spikes 34. The difference between spikes 34 and spike(s) 36 and/or 38 may not be amplitude, but instead frequency, as spike(s) 36 and/or 38 may not be at a harmonic frequency of the harmonic sound. As such, these spikes 36 and/or 38, and the rest of the amplitude between spikes 34 may be a manifestation of noise in the audio signal. As used in this instance, "noise" may not refer to a single auditory noise, but instead to sound (whether or not such sound is harmonic, diffuse, white, or of some other type) other than the harmonic sound associated with spikes 34.

The transformation that yields the transformed audio information from the audio signal may result in the coefficient related to energy being a complex number. The transformation may include an operation to make the complex number a real number. This may include, for example, taking the square of the argument of the complex number, and/or other operations for making the complex number a real number. In some implementations, the complex number for the coefficient generated by the transform may be preserved. In such implementations, for example, the real and imaginary portions of the coefficient may be analyzed separately, at least at first. By way of illustration, plot 32 may represent the real portion of the coefficient, and a separate plot (not shown) may represent the imaginary portion of the coefficient as a function of frequency. The plot representing the imaginary portion of the coefficient as a function of frequency may have spikes at the harmonics of the harmonic sound that corresponds to spikes 34.

In some implementations, the transformed audio information may represent all of the energy present in the audio signal, or a portion of the energy present in the audio signal. For example, if the transformation of the audio signal places the audio signal into the frequency-chirp domain, the coefficient related to signal intensity may be specified as a function of frequency and fractional chirp rate. In such examples, the transformed audio information may include a representation of the energy present in the audio signal having a common fractional chirp rate (e.g., a one dimensional slice through a two-dimensional frequency-chirp domain to produce a frequency domain representation with a fixed chirp rate and/or other fixed parameter).

Referring back to FIG. 1, audio features module 20 may be configured to obtain features associated with the audio signal from the transformed audio information. One or more separate features may correspond to individual methods and/or techniques of obtaining the features such as, for example, the methods and/or techniques described in connection with information reduction module 22, spectral slope module 24, and/or elsewhere herein. A feature may include a set of numbers that determine a vector, for individual segments of the audio signal, in a feature space. The feature space may be a multi-dimensional space where each dimension corresponds to one component (dimension) of the feature vector. Feature vectors corresponding to two or more methods and/or techniques of obtaining features may be combined (e.g., by vector summation) as an aggregate feature vector. Individual feature vectors and/or the aggregate feature vector may be used in the feature space for segmentation and/or classification.

According to some implementations, the features may include reduced transformed audio information, spectral slope information, mel-frequency cepstral coefficient vectors, harmonic amplitude vectors, harmonic amplitude surfaces, pitched harmonic amplitude surfaces, time derivatives of the harmonic amplitude surfaces, Gabor transforms of the fractional harmonic derivatives, and/or other features. In some implementations, a separate harmonic amplitude vector may correspond to individual time windows. Harmonic amplitude surfaces may be defined over multiple time windows (e.g., about 200 msec or 20 time windows). Pitched harmonic amplitude surfaces may have time-corresponding pitch values appended to the amplitude surface feature vector. Time derivatives of the harmonic amplitude surfaces may be normalized for harmonic amplitude (e.g., fractional harmonic derivatives). Gabor transforms of the fractional harmonic derivatives may serve to compress features information.

Individual features may be associated with a feature score relative to a predetermined speaker model. A speaker model may include a set of speech characteristics and/or other speech information unique to a specific person, a group of people, and/or other source of audible speech. A feature score may facilitate a comparison between a corresponding feature to one or more speech characteristics of a speaker model.

The information reduction module 22 may be configured to obtain reduced transformed audio information as a feature associated with the audio signal. According some implementations, obtaining the reduced transformed audio information may include determining harmonic paths for individual harmonics of the sound based on fractional chirp rate and harmonic number. Referring to FIG. 2, determining a pitch path of one of spikes 34 may include determining a center frequency of the spike as a function of time. A harmonic path may be described as a vector function of time. Such a vector may be one-dimensional, two-dimensional, or three-dimensional, or may have another dimensionality. According to some implementations, a one-dimensional vector may describe frequency versus time, amplitude versus time, chirp rate versus time, and/or other information. A two-dimensional vector may describe frequency and amplitude versus time, frequency and chirp rate versus time, amplitude and chirp rate versus time, and/or other information. A three-dimensional vector may describe frequency, chirp rate, and amplitude versus time, and/or other information. A harmonic path may be determined over the span of a portion of the audio signal (e.g., the span of one vowel), a fixed time span (e.g., 200 msec), the entire audio signal, and/or another duration of time.

Obtaining the reduced transformed audio information may include determining an amplitude value for individual harmonics at individual time windows. The amplitude value may correspond to a magnitude of a coefficient related to energy amplitude of a given harmonic at a given time. The reduced transformed audio information may be constructed using single points that correspond to the harmonic positions for individual time windows. Those points may describe the center frequency, chirp rate, time position, amplitude value, and/or other information for individual harmonics. In some implementations, values within the reduced transformed audio information between the amplitude values may be set to zero. A filter bank may be applied to the reduced transformed audio information. The filter bank may include one or more mel filters and/or other filters.

The spectral slope module 24 may be configured to obtain spectral slope information based on the transformed audio information as a feature associated with the audio signal. In some implementations, obtaining the spectral slope information may include determining an instantaneous slope of one or more harmonic envelopes in the transformed audio information as a function of frequency. In some implementations, instantaneous slope of a harmonic envelope may determined by taking, at a given time window, the derivative over frequency of the coefficient related to energy amplitude of the transformed audio information. A filter bank may be applied to the spectral slope information. The filter bank may include one or more mel filters and/or other filters.

By way of illustration, turning back to FIG. 2, plot 32 includes a harmonic envelope 39 of sound in the illustrated time sample window having a pitch φ. The harmonic envelope 39 may be formed by generating a spline through the values of the intensity coefficient at the harmonic frequencies for pitch φ. The harmonic frequencies may include two or more of the fundamental frequency through the $n^{th}$ harmonic. The dimensionality of plot 32 may be extended to include a third dimension representing time (e.g., for individual time sample windows). In such a plot (not depicted), harmonic envelope 39 may be represented as a surface over two or more time samples windows.

Referring again to FIG. 1, SNR estimator module 26 may be configured to obtain an SNR estimation as a time-varying quantity associated with the audio signal. In accordance with some implementations, obtaining the SNR estimation includes determining a harmonic energy of individual harmonics as a function of frequency and time based on the transformed audio information. An individual harmonic may be integrated over a corresponding bandwidth to determine the harmonic energy of that harmonic. A total energy of the audio signal may be determined based on the transformed audio information. Noise may be estimated as portions of the transformed audio information where the ratio between the harmonic energy and the total energy breaches a predetermined threshold. In some implementations, the ratio may be averaged over time.

Several considerations may exist in determining the threshold. For example, setting a specific threshold may result in a specific ratio of time when the ratio between harmonic energy and total energy breaches the threshold (e.g., voice is "on") versus time when the ratio does not breach the threshold (e.g., voice is "off"). The threshold value may be selected such that the ratio of time (e.g., (voice on)/(voice off)) equals an average for a given classification of speaker (e.g., by nationality, gender, age, and/or other speaker classifications) being considered. As another exemplary consideration, for a given classification procedure, a quantity VLL may be derived that equals a variance of log-likelihood ratios across a plurality of speaker models. Regardless of a final decision as to selected speaker or that there is no match, the VLL may tend to be greater when non-voiced time segments are included in the classification. Therefore, the threshold may be adjusted to minimize the VLL.

The aggregate score module 28 may be configured to obtain an aggregate score based on the feature scores according to a weighting scheme. The weighting scheme may be associated with a noise and/or SNR estimation. The aggregate score may be used to determine a likely speaker model to identify a source of the sound in the audio signal. In some implementations, aggregate score module 28 may be configured to obtain the aggregate score by summing weighted feature scores of one or more features obtained by audio features module 20.

Figure 4:
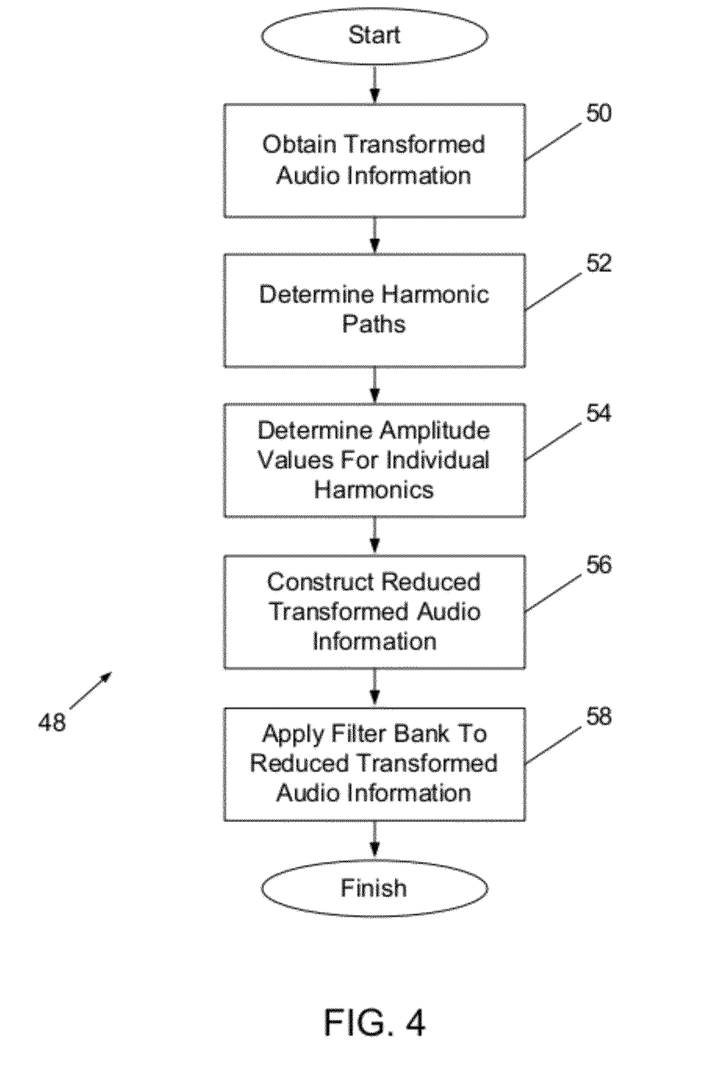
FIG. 4 illustrates a method for obtaining reduced transformed audio information as a feature associated with an audio signal, in accordance with one or more implementations.
Figure 5:
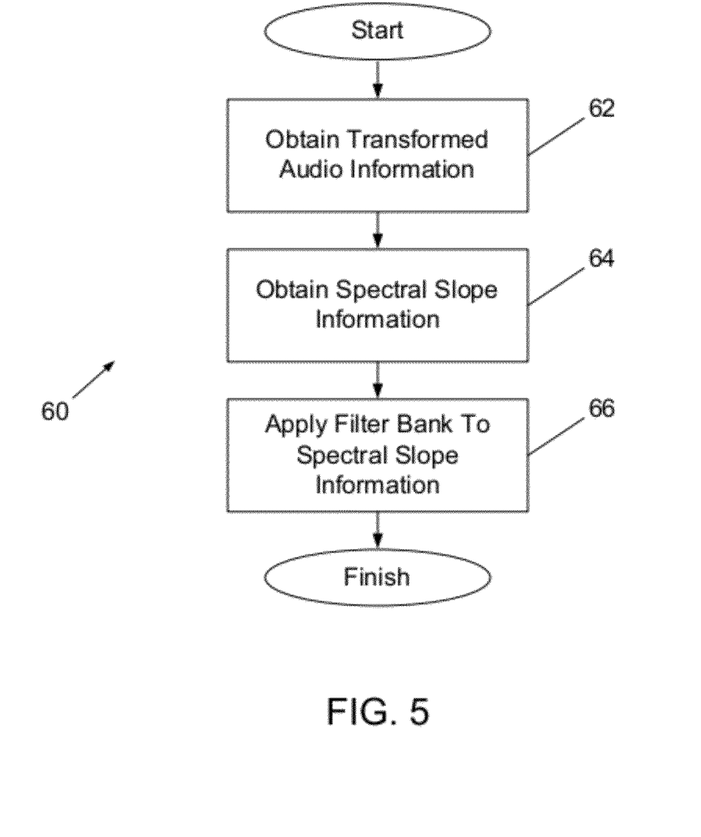
FIG. 5 illustrates a method for obtaining spectral slope information based on the transformed audio information as a feature associated with the audio signal, in accordance with one or more implementations.

In accordance with some implementations, an aggregate score may be determined for individual speaker models of a set of speaker models. A speaker within the audio signal may be identified based on the aggregates scores of the speaker models in the set. For example, a speaker associated with a speaker model having the maximum aggregate score of the set may be identified as the speaker in the audio signal. In some implementations, an aggregate score $\hat{z}$ may be expressed as $$\hat{z}_j = \sum_i c_i z_{ij},$$

where $z_{ij}$ is the feature score from the $i^{th}$ method pertaining to the $j^{th}$ speaker and/or speaker model, and $c_i$ is a positive real weighting coefficient associated with a noise estimate of the $i^{th}$ method. The $i^{th}$ method may correspond to methods described in connection with FIGS. 4 and 5, methods performed by audio features module 20 and/or other modules, and/or other methods for obtaining features associated with the audio signal.

The training module 30 may be configured to determine the weighing scheme utilized by aggregate score module 28. In accordance with some implementations, training module 30 may perform training operations on the audio signal and/or other information related to the audio signal to determine characteristics of the audio signal and/or conditions pertaining to the recording of the audio signal (e.g., type of microphone, closed room versus open air, and/or other conditions) that indicate a particular set of score weights that results in more accurate classification compared to other weighting schemes.

Processor(s) 12 may be configured to provide information processing capabilities in system 10. As such, processor(s) 12 may include one or more of a digital processor, an analog processor, a digital circuit designed to process information, an analog circuit designed to process information, a state machine, and/or other mechanisms for electronically processing information. Although processor(s) 12 is shown in FIG. 1 as a single entity, this is for illustrative purposes only. In some implementations, processor(s) 12 may include a plurality of processing units. These processing units may be physically located within the same device, or processor(s) 12 may represent processing functionality of a plurality of devices operating in coordination (e.g., "in the cloud", and/or other virtualized processing solutions).

It should be appreciated that although modules 18, 20, 22, 24, 26, 28, and 30 are illustrated in FIG. 1 as being co-located within a single processing unit, in implementations in which processor(s) 12 includes multiple processing units, one or more of modules 18, 20, 22, 24, 26, 28, and/or 30 may be located remotely from the other modules. The description of the functionality provided by the different modules 18, 20, 22, 24, 26, 28, and/or 30 described below is for illustrative purposes, and is not intended to be limiting, as any of modules 18, 20, 22, 24, 26, 28, and/or 30 may provide more or less functionality than is described. For example, one or more of modules 18, 20, 22, 24, 26, 28, and/or 30 may be eliminated, and some or all of its functionality may be provided by other ones of modules 18, 20, 22, 24, 26, 28, and/or 30. As another example, processor(s) 12 may be configured to execute one or more additional modules that may perform some or all of the functionality attributed below to one of modules 18, 20, 22, 24, 26, 28, and/or 30.

Electronic storage 14 may comprise electronic storage media that stores information. The electronic storage media of electronic storage 14 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 14 may include virtual storage resources, such as storage resources provided via a cloud and/or a virtual private network. Electronic storage 14 may store software algorithms, information determined by processor(s) 12, information received via user interface 16, and/or other information that enables system 10 to function properly. Electronic storage 14 may be a separate component within system 10, or electronic storage 14 may be provided integrally with one or more other components of system 10 (e.g., processor(s) 12).

User interface 16 may be configured to provide an interface between system 10 and users. This may enable data, results, and/or instructions and any other communicable items, collectively referred to as "information," to be communicated between the users and system 10. Examples of interface devices suitable for inclusion in user interface 16 include a keypad, buttons, switches, a keyboard, knobs, levers, a display screen, a touch screen, speakers, a microphone, an indicator light, an audible alarm, and a printer. It is to be understood that other communication techniques, either hard-wired or wireless, are also contemplated by the present invention as user interface 16. For example, the present invention contemplates that user interface 16 may be integrated with a removable storage interface provided by electronic storage 14. In this example, information may be loaded into system 10 from removable storage (e.g., a smart card, a flash drive, a removable disk, etc.) that enables the user(s) to customize the implementation of system 10. Other exemplary input devices and techniques adapted for use with system 10 as user interface 14 include, but are not limited to, an RS-232 port, RF link, an IR link, modem (telephone, cable or other). In short, any technique for communicating information with system 10 is contemplated by the present invention as user interface 14.

Figure 3:
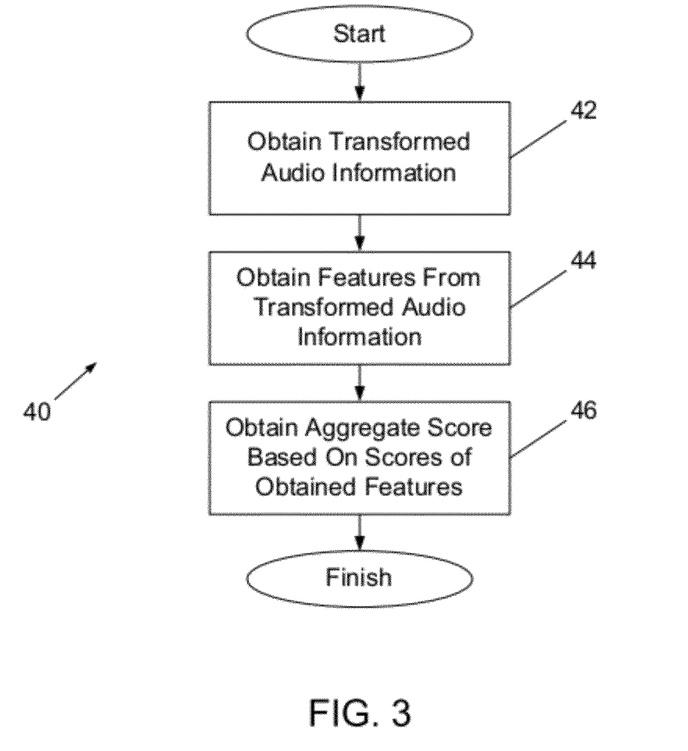
FIG. 3 illustrates a method for segmenting and/or classifying an audio signal from transformed audio information, in accordance with one or more implementations.

FIG. 3 illustrates a method 40 for segmenting and/or classifying an audio signal from transformed audio information, in accordance with one or more implementations. The operations of method 40 presented below are intended to be illustrative. In some implementations, method 40 may be accomplished with one or more additional operations not described, and/or without one or more of the operations discussed. Additionally, the order in which the operations of method 40 are illustrated in FIG. 3 and described below is not intended to be limiting.

At operation 42, transformed audio information representing a sound may be obtained. The transformed audio information may specify magnitude of a coefficient related to energy amplitude as a function of frequency for the audio signal and time. In some implementations, operation 42 may be performed by an audio information module that is the same as or similar to audio information module 18 (shown in FIG. 1 and described above).

At operation 44, features associated with the audio signal may be obtained from the transformed audio information. Individual ones of the features may be associated with a feature score relative to a predetermined speaker model. According to some implementations, one or more of the features may be obtained from information reduction module 22, spectral slope module 24, other modules, and/or another source. In some implementations, operation 44 may be performed by an audio features module that is the same as or similar to audio features module 20 (shown in FIG. 1 and described above).

At operation 46, an aggregate score may be obtained based on the feature scores according to a weighting scheme. The weighting scheme may be associated with a noise and/or SNR estimation. The aggregate score may be used in conjunction with the predetermined speaker model to identify a source of the sound (e.g., a specific person) in the audio signal. In some implementations, operation 46 may be performed by an aggregate score module that is the same as or similar to aggregate score module 28 (shown in FIG. 1 and described above).

FIG. 4 illustrates a method 48 for obtaining reduced transformed audio information as a feature associated with an audio signal, in accordance with one or more implementations. The operations of method 48 presented below are intended to be illustrative. In some implementations, method 48 may be accomplished with one or more additional operations not described, and/or without one or more of the operations discussed. Additionally, the order in which the operations of method 48 are illustrated in FIG. 4 and described below is not intended to be limiting.

At operation 50, transformed audio information representing a sound may be obtained. The transformed audio information may specify magnitude of a coefficient related to energy amplitude as a function of frequency for the audio signal and time. In some implementations, operation 50 may be performed by an audio information module that is the same as or similar to audio information module 18 (shown in FIG. 1 and described above).

At operation 52, harmonic paths may be determined for individual harmonics of the sound based on fractional chirp rate and harmonic number. In some implementations, operation 52 may be performed by an information reduction module that is the same as or similar to information reduction module 22 (shown in FIG. 1 and described above).

At operation 54, an amplitude value for individual harmonics may be determined at individual time windows. In some implementations, operation 54 may be performed by an information reduction module that is the same as or similar to information reduction module 22 (shown in FIG. 1 and described above).

At operation 56, the reduced transformed audio information may be constructed to include the amplitude values for individual harmonics as a function of frequency and time. Values within the reduced transformed audio information between the amplitude values may be set to zero. In some implementations, operation 56 may be performed by an information reduction module that is the same as or similar to information reduction module 22 (shown in FIG. 1 and described above).

At operation 58, a filter bank may be applied to the reduced transformed audio information. In some implementations, operation 58 may be performed by an information reduction module that is the same as or similar to information reduction module 22 (shown in FIG. 1 and described above).

FIG. 5 illustrates a method 60 for obtaining spectral slope information based on the transformed audio information as a feature associated with the audio signal, in accordance with one or more implementations. The operations of method 60 presented below are intended to be illustrative. In some implementations, method 60 may be accomplished with one or more additional operations not described, and/or without one or more of the operations discussed. Additionally, the order in which the operations of method 60 are illustrated in FIG. 5 and described below is not intended to be limiting.

At operation 62, transformed audio information representing a sound may be obtained. The transformed audio information may specify magnitude of a coefficient related to energy amplitude as a function of frequency for the audio signal and time. The transformed audio information may include one or more harmonic envelopes. In some implementations, operation 62 may be performed by an audio information module that is the same as or similar to audio information module 18 (shown in FIG. 1 and described above).

At operation 64, instantaneous slope of a harmonic envelope as a function of frequency may be obtained as the spectral slope information. In accordance with some implementations, the instantaneous slope may be determined by taking a derivative over frequency of the coefficient related to energy amplitude of the harmonic envelope. In some implementations, operation 64 may be performed by a spectral slope module that is the same as or similar to spectral slope module 24 (shown in FIG. 1 and described above).

At operation 66, a filter bank may be applied to the spectral slope information. In some implementations, operation 66 may be performed by a spectral slope module that is the same as or similar to spectral slope module 24 (shown in FIG. 1 and described above).

Figure 6:
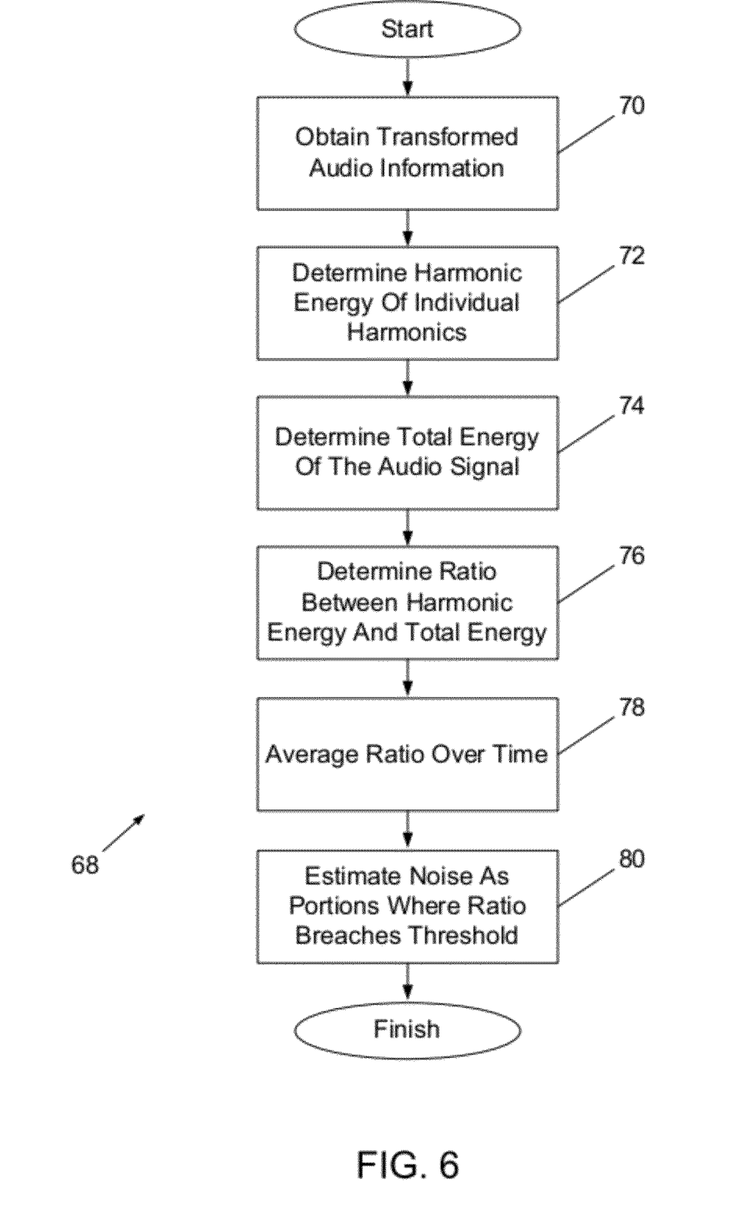
FIG. 6 illustrates a method for obtaining a noise and/or signal-to-noise ratio estimation associated with the audio signal, in accordance with one or more implementations.

FIG. 6 illustrates a method 68 for obtaining a noise and/or SNR estimation associated with the audio signal, in accordance with one or more implementations. The operations of method 68 presented below are intended to be illustrative. In some implementations, method 68 may be accomplished with one or more additional operations not described, and/or without one or more of the operations discussed. Additionally, the order in which the operations of method 68 are illustrated in FIG. 6 and described below is not intended to be limiting.

At operation 70, transformed audio information representing a sound may be obtained. The transformed audio information may specify magnitude of a coefficient related to energy amplitude as a function of frequency for the audio signal and time. In some implementations, operation 70 may be performed by an audio information module that is the same as or similar to audio information module 18 (shown in FIG. 1 and described above).

At operation 72, a harmonic energy of individual harmonics may be determined as a function of frequency and time based on the transformed audio information. In some implementations, operation 72 may be performed by an SNR estimator module that is the same as or similar to SNR estimator module 26 (shown in FIG. 1 and described above).

At operation 74, a total energy of the audio signal may be determined based on the transformed audio information. In some implementations, operation 74 may be performed by an SNR estimator module that is the same as or similar to SNR estimator module 26 (shown in FIG. 1 and described above).

At operation 76, a ratio between the harmonic energy and the total energy may be determined. In some implementations, operation 76 may be performed by an SNR estimator module that is the same as or similar to SNR estimator module 26 (shown in FIG. 1 and described above).

At operation 78, the ratio between the harmonic energy and the total energy may be averaged over time. In some implementations, operation 78 may be performed by an SNR estimator module that is the same as or similar to SNR estimator module 26 (shown in FIG. 1 and described above).

At operation 80, noise may be estimated as portions of the transformed audio information where the ratio breaches a predetermined threshold. In some implementations, operation 80 may be performed by an SNR estimator module that is the same as or similar to SNR estimator module 26 (shown in FIG. 1 and described above).

In some implementations, methods 40, 48, 60, and/or 68 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 40, 48, 60, and/or 68 in response to instructions stored electronically on an electronic storage medium. The one or more processing devices may include one or more devices configured through hardware, firmware, and/or software to be specifically designed for execution of one or more of the operations of methods 40, 48, 60, and/or 68.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured for segmenting and/or classifying an audio signal from transformed audio information, the system comprising:
    one or more processors configured to execute computer program modules, the computer program modules comprising:
        an audio information module configured to obtain transformed audio information representing a sound, wherein the transformed audio information specifies magnitude of a coefficient related to energy amplitude as a function of frequency for the audio signal and time;
        an audio features module configured to obtain features associated with the audio signal from the transformed audio information, individual ones of the features being associated with a feature score relative to a predetermined speaker model; and
        an aggregate score module configured to obtain an aggregate score based on the feature scores according to a weighting scheme, the weighting scheme being associated with a noise estimation, the aggregate score being used in conjunction with the predetermined speaker model to identify a source of the sound in the audio signal.

2. The system of claim 1, further comprising a information reduction module configured to obtain reduced transformed audio information as a feature associated with the audio signal, wherein obtaining the reduced transformed audio information includes:
    determining harmonic paths for individual harmonics of the sound based on fractional chirp rate and harmonic number;
    determining an amplitude value for individual harmonics at individual time windows; and
    constructing the reduced transformed audio information, wherein the reduced transformed audio information includes the amplitude values for individual harmonics as a function of frequency and time.

3. The system of claim 2, wherein values within the reduced transformed audio information between the amplitude values are set to zero.

4. The system of claim 2, wherein obtaining the reduced transformed audio information includes applying a filter bank to the reduced transformed audio information.

5. The system of claim 1, further comprising a spectral slope module configured to obtain spectral slope information based on the transformed audio information as a feature associated with the audio signal, wherein obtaining the spectral slope information includes taking a derivative over frequency of the coefficient related to energy amplitude of a harmonic envelope in the transformed audio information.

6. The system of claim 5, wherein obtaining the spectral slope information further includes applying a filter bank to the derivative.

7. The system of claim 1, further comprising an SNR estimator module configured to obtain a noise and/or SNR estimation associated with the audio signal.

8. The system of claim 7, wherein obtaining the noise estimation includes:
    determining a harmonic energy of individual harmonics as a function of frequency and time based on the transformed audio information;
    determining a total energy of the audio signal based on the transformed audio information;
    determining a ratio between the harmonic energy and the total energy; and
    estimating noise as portions of the transformed audio information where the ratio breaches a predetermined threshold.

9. The system of claim 7, wherein obtaining the noise estimation further includes averaging the ratio over time.

10. The system of claim 1, further comprising a training module configured to determine the weighing scheme, wherein the weighting scheme is determined based on one or more of a predetermined speaker model, a certain speaker, a set of speakers, or a certain audio capture device.

11. A computer-implemented method for segmenting and/or classifying an audio signal from transformed audio information, the method being implemented in a computer system that includes one or more physical processors, the method comprising:
    obtaining, at the one or more physical processors, transformed audio information representing a sound, wherein the transformed audio information specifies magnitude of a coefficient related to energy amplitude as a function of frequency for the audio signal and time;

obtaining, at the one or more physical processors, features associated with the audio signal from the transformed audio information, individual ones of the features being associated with a feature score relative to a predetermined speaker model; and obtaining, at the one or more physical processors, an aggregate score based on the feature scores according to a weighting scheme, the weighting scheme being associated with a noise estimation, the aggregate score being used in conjunction with the predetermined speaker model to identify a source of the sound in the audio signal.

12. The method of claim 11, further comprising obtaining, at the one or more physical processors, reduced transformed audio information as a feature associated with the audio signal, wherein obtaining the reduced transformed audio information includes:

determining, on the one or more physical processors, harmonic paths for individual harmonics of the sound based on fractional chirp rate and harmonic number;

determining, on the one or more physical processors, an amplitude value for individual harmonics at individual time windows; and constructing, on the one or more physical processors, the reduced transformed audio information, wherein the reduced transformed audio information includes the amplitude values for individual harmonics as a function of frequency and time.

13. The method of claim 12, wherein values within the reduced transformed audio information between the amplitude values are set to zero.

14. The method of claim 12, wherein obtaining the reduced transformed audio information includes applying a filter bank to the reduced transformed audio information.

15. The method of claim 11, further comprising obtaining, at the one or more physical processors, spectral slope information based on the transformed audio information as a feature associated with the audio signal, wherein obtaining the spectral slope information includes taking a derivative over frequency of the coefficient related to energy amplitude of a harmonic envelope in the transformed audio information.

16. The method of claim 15, wherein obtaining the spectral slope information further includes applying a filter bank to the derivative.

17. The method of claim 11, further comprising obtaining, at the one or more physical processors, a noise and/or SNR estimation associated with the audio signal.

18. The method of claim 17, wherein obtaining the noise estimation includes:

determining, on the one or more physical processors, a harmonic energy of individual harmonics as a function of frequency and time based on the transformed audio information;

determining, on the one or more physical processors, a total energy of the audio signal based on the transformed audio information;

determining, on the one or more physical processors, a ratio between the harmonic energy and the total energy; and estimating, on the one or more physical processors, noise as portions of the transformed audio information where the ratio breaches a predetermined threshold.

19. The method of claim 17, wherein obtaining the noise estimation further includes averaging the ratio over time.

20. The method of claim 11, further comprising determining, on the one or more physical processors, the weighing scheme based on one or more of a predetermined speaker model, a certain speaker, a set of speakers, or a certain audio capture device.

* * * * *